United States Patent
Brochhaus

(10) Patent No.: US 10,473,722 B2
(45) Date of Patent: Nov. 12, 2019

(54) METHOD AND APPARATUSES FOR AUTHENTICATING MEASUREMENT DATA FOR A BATTERY

(71) Applicants: Robert Bosch GmbH, Stuttgart (DE); Samsung SDI Co., Ltd., Yongin-si, Gyeonggi-do (KR)

(72) Inventor: Christoph Brochhaus, Aachen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 800 days.

(21) Appl. No.: 14/282,891

(22) Filed: May 20, 2014

(65) Prior Publication Data

US 2014/0346982 A1 Nov. 27, 2014

(30) Foreign Application Priority Data

May 22, 2013 (DE) .................. 10 2013 209 443

(51) Int. Cl.
*H02P 1/00* (2006.01)
*G01R 31/36* (2019.01)
(Continued)

(52) U.S. Cl.
CPC ........ *G01R 31/3648* (2013.01); *B60L 3/0084* (2013.01); *B60L 3/04* (2013.01);
(Continued)

(58) Field of Classification Search
CPC .................. G01R 31/3648; H01M 10/425
(Continued)

(56) References Cited

U.S. PATENT DOCUMENTS 6,094,053 A * 7/2000 Harvey ............ G01R 19/16542
324/426
7,657,338 B2 2/2010 Opaterny
(Continued)

FOREIGN PATENT DOCUMENTS

DE 696 29 470 T2 6/2004
DE 10 2008 008 536 A1 8/2009
(Continued)

*Primary Examiner* — Bickey Dhakal
*Assistant Examiner* — Gabriel Agared
(74) *Attorney, Agent, or Firm* — Maginot, Moore & Beck LLP

(57) ABSTRACT

A method for authenticating measurement data for a battery that comprises at least one battery module, having an associated module controller, and a central controller has the following steps: capture of measurement data from battery units by the module controller; ascertainment of at least one additional information carrier, which is set up to authenticate the measurement data, by the module controller; transmission of the measurement data and of the additional information carrier from the module controller to the central controller; and validation of the measurement data by the central controller using the additional information carrier. Furthermore, a data structure, a computer program and a battery management system are specified that are set up to perform the method, and also a battery and a motor vehicle, the drive system of which is connected to a battery of this kind.

8 Claims, 2 Drawing Sheets

(51) Int. Cl.
*H01M 10/42* (2006.01)
*G01D 9/00* (2006.01)
*G01D 21/00* (2006.01)
*G06F 21/64* (2013.01)
*B60L 3/00* (2019.01)
*B60L 3/04* (2006.01)
*B60L 3/12* (2006.01)
*B60L 58/18* (2019.01)
*B60L 58/12* (2019.01)
*B60L 58/21* (2019.01)
*H01M 10/48* (2006.01)

(52) U.S. Cl.
CPC ............... *B60L 3/12* (2013.01); *B60L 58/12* (2019.02); *B60L 58/18* (2019.02); *B60L 58/21* (2019.02); *G01D 9/005* (2013.01); *G01D 21/00* (2013.01); *G06F 21/64* (2013.01); *H01M 10/425* (2013.01); *B60L 2240/545* (2013.01); *B60L 2240/547* (2013.01); *B60L 2240/549* (2013.01); *H01M 10/48* (2013.01); *H01M 2010/4278* (2013.01); *Y02T 10/7005* (2013.01); *Y02T 10/7044* (2013.01); *Y02T 10/7061* (2013.01)

(58) Field of Classification Search
USPC .............................................. 318/139; 702/63
See application file for complete search history.

(56) References Cited

U.S. PATENT DOCUMENTS

| | | | |
|---|---|---|---|
| 7,863,858 B2 | 1/2011 | Gangstoe et al. | |
| 7,962,661 B2* | 6/2011 | Robertson | G06F 13/4226 710/110 |
| 8,227,944 B2* | 7/2012 | Li | H01M 10/425 307/150 |
| 2012/0159641 A1* | 6/2012 | Rossi | G01D 4/004 726/27 |

FOREIGN PATENT DOCUMENTS

| | | |
|---|---|---|
| DE | 10 2010 038 886 A1 | 2/2012 |
| DE | 10 2012 211 120 A1 | 1/2014 |

* cited by examiner

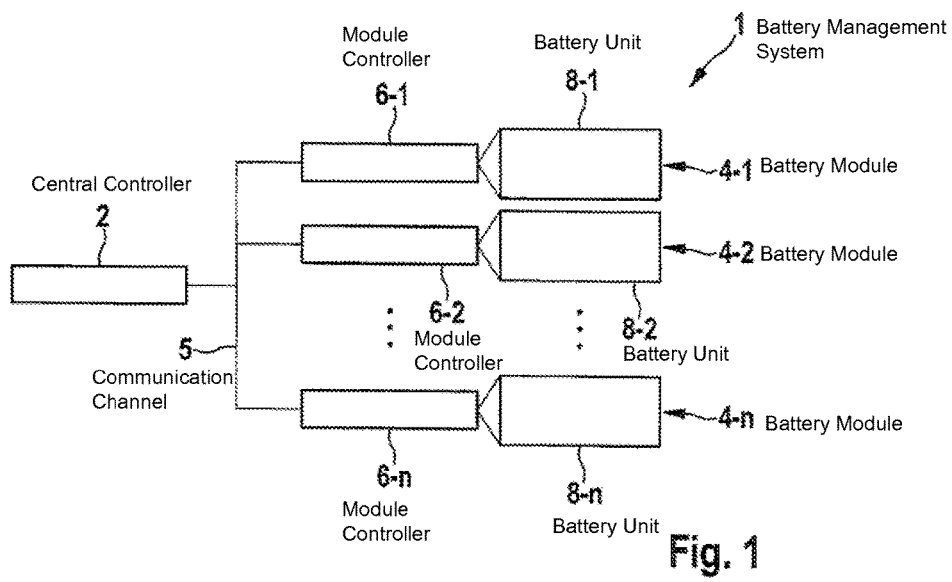
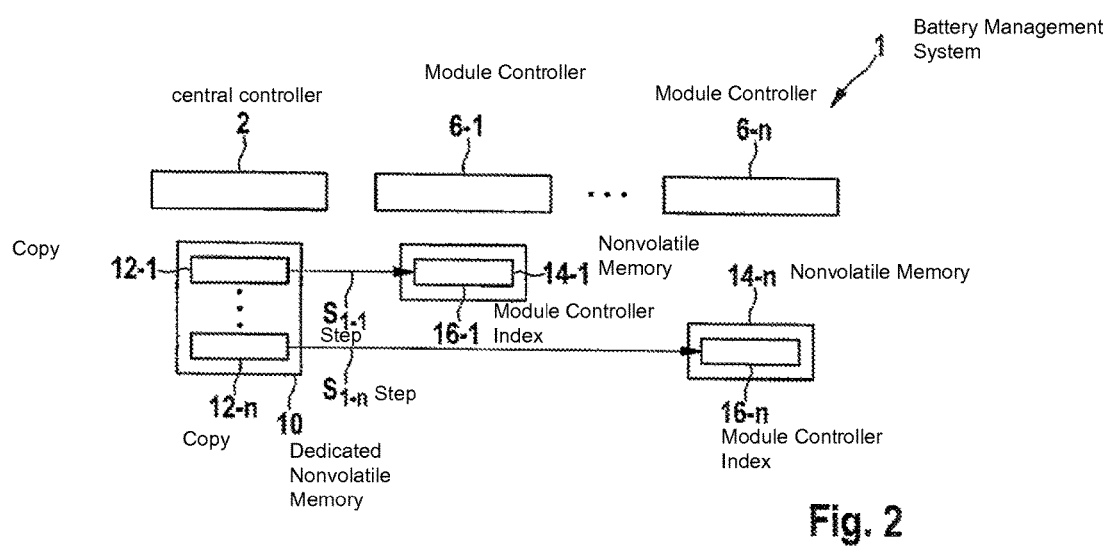

METHOD AND APPARATUSES FOR AUTHENTICATING MEASUREMENT DATA FOR A BATTERY

This application claims priority under 35 U.S.C. § 119 to patent application no. DE 10 2013 209 443.4, filed on May 22, 2013 in Germany, the disclosure of which is incorporated herein by reference in its entirety.

BACKGROUND

The disclosure relates to a method for authenticating measurement data for a battery that comprises at least one battery module, having an associated module controller, and a central controller, wherein measurement data from battery units are captured by the at least one module controller.

In addition, a data structure having such measurement data, a computer program and a battery management system are specified that are set up particularly to perform the method. In addition, a battery and a motor vehicle having such a battery are specified.

Electronic controllers are used in increasing numbers in the automotive environment today. Examples of these are engine controllers or controllers for ABS or the airbag. For electrically driven vehicles, the focal point of research today is the development of powerful battery packs having associated battery management systems, i.e. controllers that are equipped with a piece of software for monitoring the battery functionality. Battery management systems ensure the safe and reliable operation, inter alia, of the battery cells and battery packs used. They monitor and control currents, voltages, temperatures, isolating resistors and further variables for individual cells and/or the entire battery pack. These variables can be used to provide management functions that increase the life, reliability and safety of the battery system.

U.S. Pat. No. 7,863,858 B2 shows a method and an apparatus for authenticating modules in a battery pack. The communication method presented therein comprises the generation of random numbers in the battery management system in order to establish whether an apparatus is connected to the battery in an authorized manner.

U.S. Pat. No. 7,657,338 B2 shows an automation system having a control unit that is connected to a sensor. An RFID chip allows the authentication of the sensor.

SUMMARY

A method according to the disclosure for authenticating measurement data for a battery comprises the following steps:
a) capture of measurement data from battery units by the module controller;
b) ascertainment of at least one additional information carrier, which is set up to authenticate the measurement data, by the module controller;
c) transmission of the measurement data and of the at least one additional information carrier from the module controller to the central controller;
d) validation of the measurement data by the central controller using the at least one additional information carrier.

Measurement data, which are usually captured and monitored by module controllers, comprise the temperature, the state of charge, the output current or the provided voltage, for example. Similarly, use data may comprise variables derived therefrom, for example variables that are summed or integrated with respect to time, variables that are multiplied by one another or aggregated otherwise, such as also what is known as the state of health (SOH) of the battery in suitable quantifiable units. Furthermore, differential values between minimum and maximum states, for example states of charge, relative battery powers or number of performances of charging and discharge cycles, may be included in the use data. Such measurement data are used to provide battery management functions, such as the ascertainment of a probable life for the battery system or of a state of health (SOH) of the battery. When the driving cycles are counted, it is furthermore possible to draw conclusions about the average use of the battery per driving cycle. The measurement data can also be used to determine causes in cases of loss or damage.

The method can be used particularly on lithium ion batteries and on nickel metal hydride batteries. Preferably, it is used on multiple and particularly on all modules of one or more batteries that are operated essentially simultaneously.

According to one preferred embodiment, the additional information carrier is a checksum that is ascertained using the measurement data and an individual key of the module controller. With particular preference, the additional information carrier is ascertained using the measurement data and a serial number for the module controller or an individual module controller index that is known to the central control system.

According to one preferred embodiment, the individual key of the module controller is allocated by the central controller. In this case, provision may be made, by way of example, for the central controller to determine a random number, for example a 32-bit number, that is stored permanently in the central controller. The central controller transmits the individual module controller index to the respective module controller, which stores said module controller index in an associated nonvolatile memory. By way of example, the individual key can be transmitted on the same communication path as that on which the measurement data are interchanged, for example via the CAN bus.

With particular preference, the additional information carrier is ascertained by means of a one-way function f(x,y) from the individual key of the module controller and from the measurement data. The one-way function f(x,y)→z is preferably defined with properties that are such that its function value z is simple to calculate and reversal of the function is very complex and practically impossible. Examples of such one-way functions can be found in cryptography, for example hash functions, particularly SHA-1, SHA-2 or SHA-3 or as multiplication of prime numbers.

Hash functions are suitable for confirming the integrity of the data. That is to say that it is practically impossible to use intentional modification to produce measurement data that have the same hash value as given measurement data. Without knowledge of the computation code for the additional information carrier it is thus impossible for the potential attacker to produce a possible combination of measurement data and matching signature and to store said combination in the controller.

The checksum may also be formed by means of a cyclic redundancy check. The cyclic redundancy check (CRC) involves a bitstream from the measurement data being divided by a stipulated generator polynomial, what is known as the CRC polynomial, modulo 2, with a remainder being left. This remainder is the CRC value, which is appended to the measurement data.

In the case of the one-way function $f(x,y) \rightarrow z$, the value y is the individual key of the module controller. The value y ensures that the same one-way function delivers different results in different controllers. Each module controller has its own module controller index and therefore uses a one-way function that is different than the others for the same measurement data. Inferring the computation code becomes much more difficult as a result of the use of the key that is individual to the module controllers. The input value x is the measurement data. By way of example, all measurement data can be logically combined by means of an XOR function to produce a value that is then used together with the value y to calculate the additional information carrier.

Following their capture, the measurement data are provided, either individually or in packages, with the additional information carrier, which in this context can also be referred to as a piece of authentication information or as what is known as a signature. The signature, for example a 32-bit value, is stored in a data structure together with the measurement data.

According to one preferred embodiment, the method comprises the following further step:

e) storage of the measurement data in a nonvolatile memory of the central controller.

A nonvolatile memory of this kind is what is known as an EEPROM, i.e. an electrically erasable programmable read-only memory, for example.

According to one preferred embodiment, in the event of failure of the validation the central controller produces an error message and makes it available on the CAN bus, for example. As an alternative to this or in addition to this, provision may be made for the central controller to disable or reduce the battery in part, for example to initiate what is known as a limp home.

Preferably, the verification takes place after a defined number of measurement cycles, for example after every hundredth, after every thousandth or after every ten-thousandth measurement cycle. Alternatively, the verification can take place after a particular period of time, for example every day if the battery has been used on that day.

Furthermore, the disclosure proposes a data structure having measurement data from battery units and having at least one additional information carrier that is set up to check the validity of the measurement data. The data structure has been created during the performance of one of the described methods. By way of example, the data structure is read by a computer device for maintenance and service purposes or for the purpose of authenticating the measurement data.

In addition, the disclosure proposes a computer program according to which one of the methods described herein is performed when the computer program is executed on a programmable computer device. By way of example, the computer program may be a module for implementing a device for providing measurement data for a battery management system and/or may be a module for implementing a battery management system of a vehicle. The computer program can be stored on a machine-readable storage medium, for example on a permanent or rewritable storage medium or in association with a computer device, for example on a portable memory, such as a CD-ROM, DVD, a USB stick or a memory card. In addition or as an alternative to this, the computer program can be provided on a computer device, such as on a server or a cloud server, for download, for example via a data network, such as the Internet, or a communication link, such as a telephone line or a wireless connection.

Furthermore, the disclosure provides a battery management system (BMS), having a unit for capturing measurement data from battery units, a unit for ascertaining an additional information carrier that is set up to authenticate the measurement data, units for transmitting the measurement data and the additional information carrier from a module controller to a central controller, and a unit for validating the measurement data using the additional information carrier. Preferably, the battery management system has a nonvolatile memory and also a unit for storing the transmitted and validated measurement data in a nonvolatile memory.

Furthermore, the disclosure provides a battery, particularly a lithium ion battery or a nickel metal hydride battery, that comprises a battery management system and can be connected to a drive system in a motor vehicle, wherein the battery management system is designed as described previously and/or is set up to carry out the method according to the disclosure.

In the present description, the terms "battery" and "battery unit" are used for storage battery or storage battery unit in a manner customized to ordinary language use. The battery preferably comprises one or more battery units that are able to comprise a battery cell, a battery module, a module line or a battery pack. In this case, the battery cells are preferably physically combined and connected to one another in terms of circuitry, for example connected up in series or in parallel to form modules. A plurality of modules can form what are known as battery direct converters (BDC) and a plurality of battery direct converters can form a battery direct inverter (BDI).

Furthermore, the disclosure provides a motor vehicle having such a battery, wherein the battery is connected to a drive system in the motor vehicle. Preferably, the method is used for electrically driven vehicles in which a multiplicity of battery cells are interconnected in order to provide the necessary drive voltage.

The method according to the disclosure can be used to prevent manipulation of measurement data and/or unauthorized replacement of the battery modules. Furthermore, the illegitimate use of battery packs outside of specifications through manipulation of the measurement data can be spotted. If measurement data do not have a correct additional information carrier, this is an indication of the manipulation of the measurement data or of a faulty memory.

Without exact knowledge of the computation code and the explicit identification of the module controller, it is not possible for a potential attacker to calculate a plausible signature. What is known as reverse engineering of the signature calculation by means of a sufficiently large number of known measurement data signature combinations is also rendered much more difficult through the use of the individual module controller serial numbers. For the unlikely case that an attacker has decrypted the protection of the use information for a module, he is at most able to falsify the use information for this one module, and all further modules continue to be protected. Furthermore, it is particularly advantageous that the one-way functions can be implemented in identical fashion on all module controllers, since the sensor identification alters the one-way function for each module controller explicitly.

Particularly advantageously for security reasons and for the purpose of handling warranty claims, the replacement of module controllers is also detected. When illegitimate replacement is detected, the battery management system can disable use of the entire battery pack or put it into failsafe mode.

The central battery controller and the local module controllers can be configured, and can react to the falsification, in arbitrary fashion, for example by means of annotations in the fault memory or by disabling the battery. Furthermore, the controller is provided with the opportunity to detect memory faults, and it is able to react as appropriate and to discontinue use of the faulty memory cells.

It is also particularly advantageous that the authentication can be performed very quickly and with little complexity, since only a signature is communicated and needs to be checked. The method is also distinguished by a small additional data volume, since a single signature may also be associated with a large number of measured values. Furthermore, the startup process for the battery management system, what is known as the system boot, is not slowed down, since it is possible to perform a consistency check for the signatures as part of the cyclic measurement data communication.

BRIEF DESCRIPTION OF THE DRAWINGS

Exemplary embodiments of the disclosure are presented in the drawings and are explained in more detail in the description below.

In the drawings:

FIG. 1 shows a battery management system according to an embodiment of the disclosure, FIG. 2 shows an example of training for module controllers.

DETAILED DESCRIPTION

Figure 3:
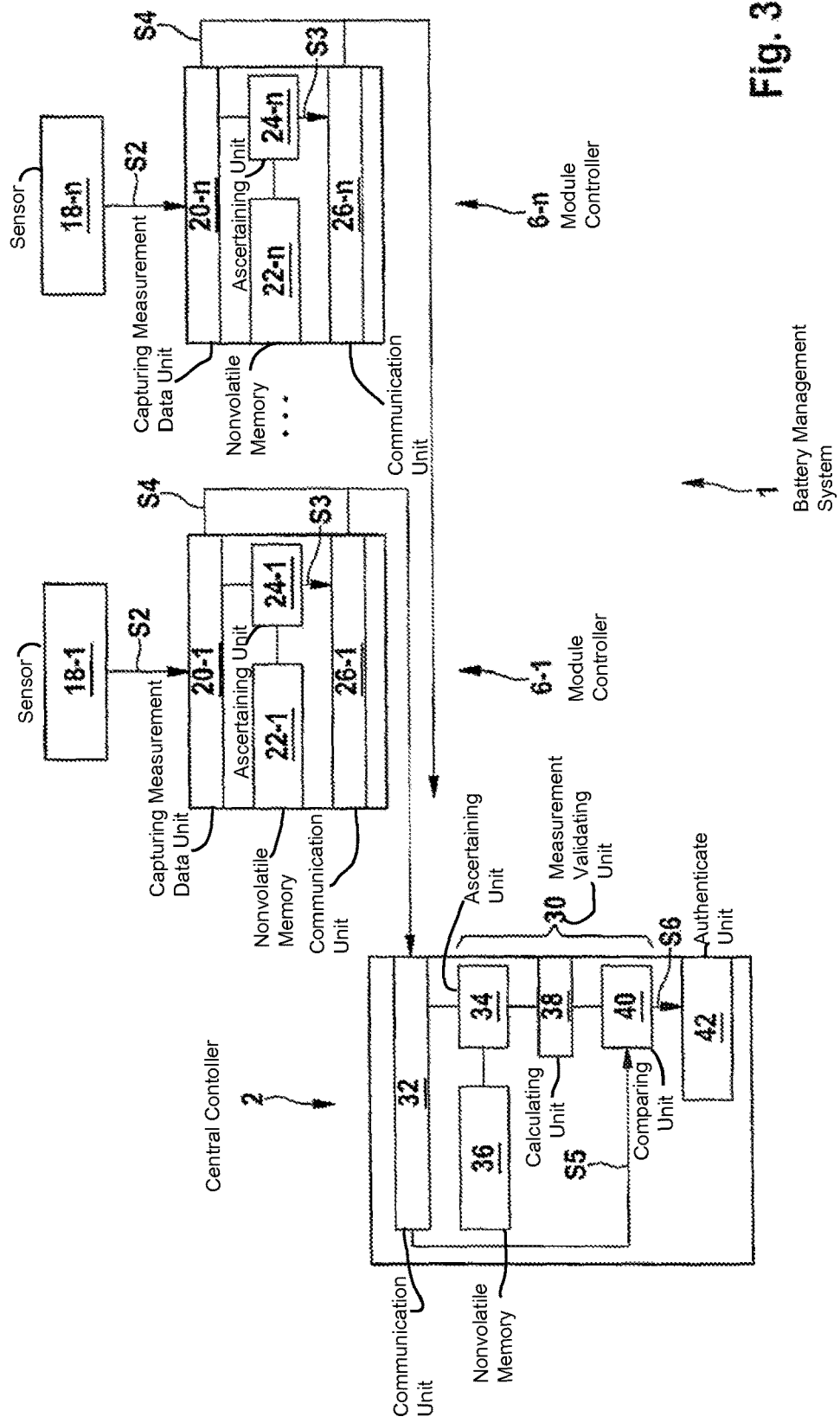
FIG. 3 shows an example of a system and method according to the disclosure.

FIG. 1 shows a battery management system 1 according to an embodiment of the present disclosure. The battery management system 1 comprises a central controller 2, which can also be called a BCU (Battery Control Unit), and a number of battery modules 4-1, 4-2, ..., 4-$n$, which each have dedicated module controllers 6-1, 6-2, ..., 6-$n$, which are also called CMCs (Cell Module Controllers). Each module 4 has associated battery units 8 having a plurality of battery cells, these usually being connected in series and to some extent additionally in parallel in order to attain the requisite power and energy data with the battery system. The individual battery cells are lithium ion batteries with a voltage range from 2.8 to 4.2 volts, for example. The communication between the central controller 2 and the module controllers 6 takes place via a communication channel 5, for example via a CAN bus.

FIG. 2 shows an example of training for module controllers 6 in a battery management system 1, which may be designed as described with reference to FIG. 1, for example. The battery management system 1 comprises a central controller 2 with an associated nonvolatile memory 10 and module controllers 6-1, ..., 6-$n$ with associated nonvolatile memories 14-1, ..., 14-$n$.

The process of training is shown in FIG. 2 as steps S1-1, ..., S1-$n$. In this case, upon first use of the module controller 6, for example, the latter receives from the central controller 2 a random number as an individual module controller index, for example a 32-bit number. The central controller 2 transmits the module controller index 16-1, ..., 16-$n$ to the module controllers 6, which store it in the respective nonvolatile memories 14. Furthermore, the central controller 2 stores the module controller index as a copy 12-1, ..., 12-$n$ in the dedicated nonvolatile memory 10. Hence, each module controller 6 has a dedicated module controller index 16 that differs from the other indices. The indices 16 form the parameters y in the previously described one-way functions $f(x,y) \rightarrow z$, as a result of which each module controller 6 implements a different one-way function. By way of example, the transmission can take place on the same communication path as the interchange of the measurement data, particularly via the CAN bus. The training is a one-off process and can take place in a protected environment in the assembly plant. This ensures that this process is not logged by unauthorized parties.

FIG. 3 shows a battery management system 1 according to the disclosure that carries out the method according to the disclosure. The battery management system 1 comprises a central controller 2 and a plurality of module controllers 6-1, ..., 6-$n$. The module controllers 6-1, ..., 6-$n$ are coupled to sensors 18-1, ..., 18-$n$ that capture measurement data, such as temperatures, state of charge, current or voltage, and provide them for the module controller 6 in a step S2. The module controllers 6 each comprise a unit 20-1, ..., 20-$n$ for capturing the measurement data, which receives the measurement data from the sensors 18. The unit 20 for capturing the measurement data is coupled to a unit 24 for ascertaining an additional information carrier that is set up to authenticate the measurement data. The unit 24 for ascertaining the additional information carrier receives the measurement data from the unit 20 for capturing the measurement data and receives a controller identification from a nonvolatile memory 22. From these input parameters, the unit 24 calculates the signature by using the one-way function and makes said signature available to a communication unit 26 in a step S3. In a further step S4, the communication unit 26 transmits the measurement data and the additional information carrier to the central controller 2.

The central controller 2 comprises a communication unit 32 for receiving the measurement data and the additional information carrier from the module controllers 6. The communication unit 32 for receiving the measurement data and the additional information carrier makes the received measurement data and the additional information carrier available to a unit 30 for validating the measurement data using the additional information carrier. The unit 30 for validating the measurement data comprises a unit 34 for ascertaining the module controller index from a nonvolatile memory 36 of the central controller 2. The unit 30 for validating the measurement data furthermore comprises a unit 38 for calculating a signature using the measurement data and the module controller index from the nonvolatile memory 36 of the central controller and a unit 40 for comparing the transmitted signature with the calculated signature.

In a further step S6, the information is processed further. If the measurement data have been authenticated 42 by the unit 30 for validating the measurement data, they are processed further, for example stored, or provided for a communication bus. If the signatures do not match, the following scenarios may be present:

a) the module controller 6 has been replaced;
b) a nonvolatile memory of the module controller or of the central controller is faulty;
c) error during the data transmission;
d) measurement data have been falsified.

Preferably, the central controller 2 performs further tests in order to localize the source of error, for example in order to ascertain whether it is an error that can be attributed to an individual module controller 6 or whether each module controller 6 is affected. In the latter case, an error in the communication channel can be assumed. In the case of errors that indicate falsified measurement data, the central controller 2 will disable the operation of the battery pack, since not all module controllers 6 are in the original state. Provision may be made for the central controller 2 to permit restricted operation of the battery pack, for example in order to leave the vehicle fit to drive to the extent that it can be taken to a workshop for examination, what is known as limp home.

If a faulty module controller 6 is replaced, provision is made for the central controller 2 to retrain said controller. This process is preferably possible only in a workshop and protected separately by what is known as a seed-and-key method, for example. There are two options for replacement of the central controller 2, namely retraining all module controllers 6 that are connected to the central controller 2 or transferring the module controller indices stored in the faulty central controller 2 to the new central controller. Both are preferably performed under the protection of what is known as a seed-and-key method.

The disclosure is not limited to the exemplary embodiments described here and to the aspects highlighted therein. On the contrary, a large number of modifications that are within the scope of action of a person skilled in the art are possible within the scope indicated by the disclosure.

What is claimed is:

1. A method for authenticating measurement data for a battery that includes (i) at least one battery module having an associated module controller and a battery unit, and (ii) a central controller, the method comprising:
   capturing measurement data for the battery module using at least one sensor and transmitting the captured measurement data to the module controller;
   ascertaining at least one additional information carrier, which is configured to authenticate the measurement data, with the module controller;
   transmitting the measurement data and the additional information carrier from the module controller to the central controller; and
   validating the transmitted measurement data with the central controller using the transmitted additional information carrier,
   wherein the additional information carrier is a checksum that is generated by the module controller as a function of the measurement data and an individual key of the module controller,
   wherein validating the measurement data includes:
      calculating a received signature based on the transmitted measurement data and the individual key of the module controller using the central controller, the received signature corresponding to a checksum that is generated by the central controller as a function of the transmitted measurement data and the individual key of the module controller, and
      comparing the received signature with a transmitted signature to determine whether the transmitted measurement data is valid, the transmitted signature corresponding to the checksum received from the module controller.

2. The method according to claim 1, wherein the individual key of the module controller is allocated by the central controller.

3. The method according to claim 1, further comprising:
   in response to failure of the validation the central controller, performing at least one of disabling the battery in part or in full and producing an error message.

4. The method according to claim 1, further comprising:
   storing the measurement data in a nonvolatile memory of the central controller.

5. A programmable computer device comprising:
   a memory; and
   a processor configured to execute a computer program stored in the memory to implement the method according to claim 1, the method including:
      capturing measurement data from battery units with the module controller;
      at least one additional information carrier, which is configured to authenticate the measurement data, with the module controller;
      transmitting the measurement data and the additional information carrier from the module controller to the central controller; and
      validating the measurement data with the central controller using the additional information carrier,
   wherein the additional information carrier is a checksum that is generated by the module controller as a function of the measurement data and an individual key of the module controller, and
   wherein validating the measurement data includes:
      calculating a received signature based on the transmitted measurement data and the individual key of the module controller using the central controller, the received signature corresponding to a checksum that is generated by the central controller as a function of the transmitted measurement data and the individual key of the module controller, and
      comparing the received signature with a transmitted signature to determine whether the transmitted measurement data is valid, the transmitted signature corresponding to the checksum received from the module controller.

6. The method of claim 1, wherein the individual key is a serial number of the module controller.

7. A data structure comprising:
   measurement data from battery units; and
   at least one additional information carrier that is configured to check the validity of the measurement data when the data structure is read by a computer device,
   wherein the data structure has been created during the performance of the method, the method including:
      capturing measurement data for the battery module using at least one sensor and transmitting the captured measurement data to the module controller;
      ascertaining at least one additional information carrier, which is configured to authenticate the measurement data, with the module controller;
      transmitting the measurement data and the additional information carrier from the module controller to the central controller; and
      validating the measurement data with the central controller using the additional information carrier,
   wherein the additional information carrier is a checksum that is generated by the module controller as a function of the measurement data and an individual key of the module controller, and
   wherein validating the measurement data includes:
      calculating a received signature based on the transmitted measurement data and the individual key of the module controller using the central controller, the received signature corresponding to a checksum that is generated by the central controller as a function of the transmitted measurement data and the individual key of the module controller, and comparing the received signature with a transmitted signature to determine whether the transmitted measurement data is valid, the transmitted signature corresponding to the checksum received from the module controller.

8. A battery management system for a battery that includes at least one battery module having an associated module controller, and a central controller, comprising:
a capturing unit configured to capture measurement data from battery units;
a carrier unit configured to ascertain an additional information carrier that is set up to authenticate the measurement data;
transmitting units configured to transmit the measurement data and the additional information carrier from the module controller to the central controller; and
a validating unit configured to validate the measurement data using the additional information carrier,
wherein the additional information carrier is a checksum that is generated by the module controller as a function of the measurement data and an individual key of the module controller, and
wherein validating the measurement data includes:
calculating a received signature based on the transmitted measurement data and the individual key of the module controller using the central controller, the received signature corresponding to a checksum that is generated by the central controller as a function of the transmitted measurement data and the individual key of the module controller, and
comparing the received signature with a transmitted signature to determine whether the transmitted measurement data is valid, the transmitted signature corresponding to the checksum received from the module controller.

* * * * *